April 14, 1959  T. R. HALL  2,881,730
BOAT STEERING DEVICE
Filed April 29, 1955  2 Sheets-Sheet 1

INVENTOR.
THANE R. HALL
BY
Robert D. Mentag
ATTORNEY

April 14, 1959     T. R. HALL     2,881,730
BOAT STEERING DEVICE

Filed April 29, 1955     2 Sheets-Sheet 2

INVENTOR.
THANE R. HALL
BY Robert G. Mentag
ATTORNEY

United States Patent Office 2,881,730
Patented Apr. 14, 1959

2,881,730

BOAT STEERING DEVICE

Thane R. Hall, Detroit, Mich.

Application April 29, 1955, Serial No. 504,729

4 Claims. (Cl. 114—153)

This invention relates generally to a steering device suitable for use with an outboard motor boat and the like, and, more particularly, to a steering device which is capable of being operated by the feet of the operator.

It is frequently desirable when fishing from a small power driven boat, as when trolling, to be able to control the movement of the boat by means other than the fisherman's hands, so as to allow the operator of the boat controls the use of both of his hands for fishing activities. Accordingly, it is the primary object of this invention to provide a steering device for use on a small power driven boat, whereby, a person fishing from the boat may control said steering device with his feet, thus leaving both of his hands free for manipulating his fishing gear.

It is another object of this invention to provide a foot operated steering device which can be readily applied to the prevailing types of outboard motor boats and the like.

It is a further object of this invention to provide a foot operated steering device for a power driven boat which is simple, compact and rugged in construction, economical of manufacture, and efficient in operation.

It is a still further object of this invention to provide a foot operated steering device for a power driven boat which includes a means for mounting the steering device on the boat, a vertical supporting post which is swivelly mounted on said mounting means, an outwardly extending horizontal arm on said post to which is fixedly secured the boat control cable, and, a cross-bar fixed to said post for engagement by the feet of a person sitting in the boat.

Other objects, features and advantages of this invention will be apparent from the following detailed description and the appended claims, reference being had to the accompanying drawings forming a part of the specification, wherein like reference numerals designate corresponding parts of the several views.

Before explaining in detail the present invention, it is to be understood, that the invention is not limited in its application to the details of construction and arrangement of parts illustrated in the accompanying drawings, since the invention is capable of other embodiments and of being practiced or carried out in various ways. Also, it is to be understood, that the phraseology and terminology employed herein is for the purpose of description and not limitation.

Figure 1:
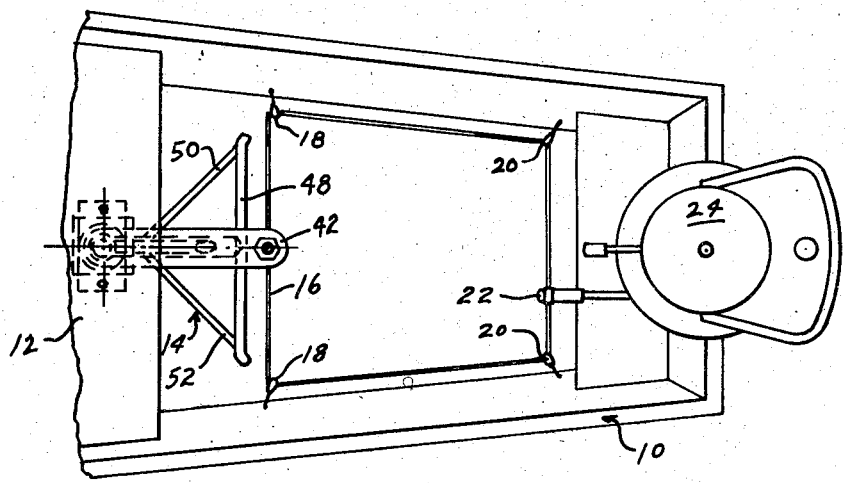
Fig. 1 is a partial top plan view of an outboard motor boat equipped with a steering device made in accordance with the principles of the invention.

In the drawings, the illustrative embodiment comprises a structure which may be easily mounted on a power driven boat, as designated by the numeral 10 and which is provided with a seat 12. The steering device of the present invention is generally indicated by the numeral 14. As is best seen in Fig. 1, the boat steering control cable 16 is operatively engaged by the steering device 14, and, said cable then passes through a pair of front guide pulleys 18 and a pair of rear guide pulleys 20, and, thence is connected to the tiller arm 22 of the outboard motor 24. The aforementioned cable control setup is merely illustrative of how the steering device may be used on an outboard motor boat. The instant steering device may also be used on power driven boats having a stationary type engine.

Figure 2:
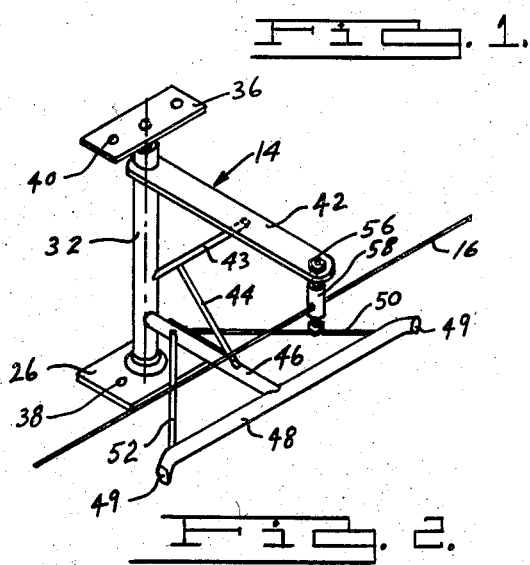
Fig. 2 is a perspective view of the steering device illustrated in Fig. 1.
Figure 3:
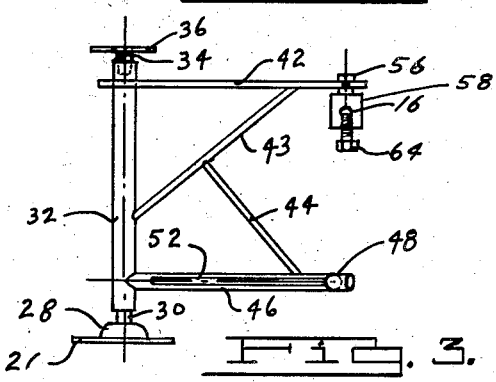
Fig. 3 is a side elevational view of the structure illustrated in Fig. 2.
Figure 4:
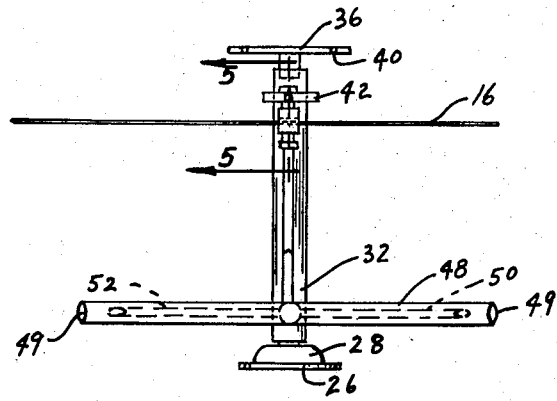
Fig. 4 is a front elevational view of the structure illustrated in Fig. 2.

As is best seen in Fig. 2, the steering device comprises a base plate 26 on which is fixedly mounted a ball joint housing 28. A support rod 30 which is provided with a ball member on the lower end thereof is swivelly mounted in the housing 28. Fixedly secured to the upper end of the rod 30 is a hollow conduit housing 32 in the upper end of which is slidably carried a support shaft 34. An upper supporting plate 36 is secured to the top of the shaft 34. It will be obvious, that the conduit 32 is rotatable on the shaft 34. The plates 26 and 36 are provided with suitable holes therethrough, as 38 and 40, respectively, through which suitable bolts may be passed to secure these plates to the bottom of the boat and to the underside of the boat seat 12, respectively.

An outwardly, horizontal arm 42 is secured to the front of the conduit or post 32, and is supported by a strut 43, which is connected between the post 32 and said arm. A second outwardly, horizontal arm 46 is secured to the post 32, at a point below the arm 42 and is provided with a supporting strut 44, which runs between the arm 46 and the strut 43. Fixed to the front end of the arm 46 is a cross-bar 48 which is provided with curved end portions 49 which extend outwardly from the steering device. The cross-bar 48 is provided with strengthening members, as 50 and 52 which run between the arm 46 and said cross-bar.

Figure 5:
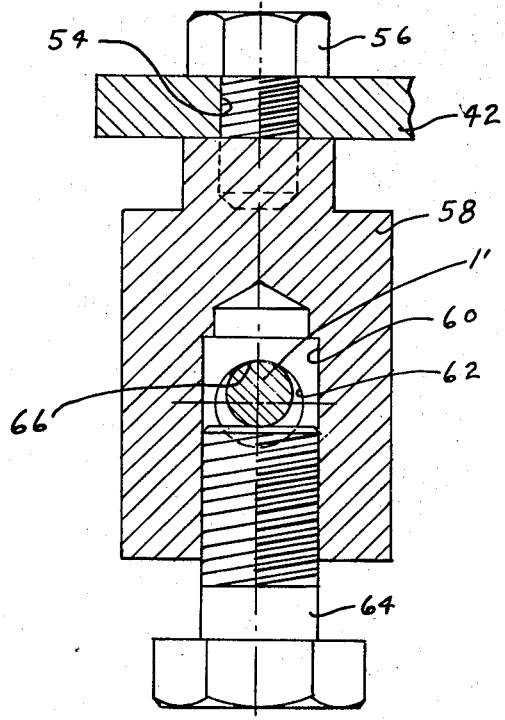
Fig. 5 is an enlarged fragmentary view of the structure illustrated in Fig. 4, taken along the line 5—5 thereof, and shown partly in section.

As is best seen in Fig. 5, the outer end of the arm 42 is provided with a vertical aperture therethrough, as 54, through which is mounted a lock bolt 56, or the like. The lock bolt 56 is adapted to lockingly engage a suitable threaded hole in the upper side of the round bushing 58, and to secure the bushing in a fixed position against the lower side of the arm 42. The bushing 58 is provided with an axial, threaded aperture 60, which extends upwardly from the lower surface thereof, and, which communicates with a transverse aperture 62 through which passes the control cable 16. A lock bolt 64, or the like, is threadably mounted in the aperture 60 and functions to secure the cable 16 in place against the upper surface 66 of the transverse aperture 62.

In operation, a person sitting on a seat (not shown) in the boat 10, which seat would be disposed aft of the seat 12, may control the direction of movement of the boat, by merely placing his feet against the cross-bar or foot rest 48, and, pushing said bar so as to swivel the post 32 in one direction or the other. It will be seen, that as the post 32 is swivelled, the control cable 16 will be moved accordingly, and, the boat tiller 22 will be moved as desired. Such action leaves the hands of the operator free to be used for other activities, as fishing or the like.

Although the preferred embodiment is illustrated as being mounted between the bottom of the boat and the underside of the seat 12, it will be understood, that the steering device may be attached to the boat by other methods. For example, in the absence of a suitably disposed boat seat, as 12, the upper supporting plate 36 may be fixed in place by means of a suitable horizontal arm, or arms, extending inwardly from the sides of the boat, or, from the bottom of the boat, immediately forward of the steering device. A further method for swively retaining the post 32 in place, would be to mount it within a center, or deck section on the boat.

It will be seen, that the control cable 16 may be suitably guided, so as to be attached directly to the motor frame, instead of the arrangement shown, if desired. If the boat on which the steering device is to be mounted has a stationary type engine, with a rudder mounted on a post fixed to the aft end of the boat, then the control cable 16 may be attached to the usual tiller arm connected to the top end of the rudder post, by a suitable guide pulley arrangement.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. The combination of a boat with a deck, a seat, a tiller arm, and a steering device for the boat comprising: a first supporting plate adapted for mounting on the deck of the boat; a vertical post; means for swively mounting the lower end of said post on said first supporting plate; a second supporting plate adapted for attachment to the underside of the boat seat; means for rotatably and slidably mounting the upper end of said post on said second supporting plate; an arm fixedly mounted on the upper end of said post and extending outwardly therefrom; a control cable connected to the tiller arm; means for connecting the tiller arm control cable to said arm; and, a means carried by said post for engagement by the feet of a person sitting in the boat for swivelling said post, whereby, said tiller arm control cable will be moved as desired.

2. The combination of a boat with a deck, a seat, a tiller arm, and a steering device for the boat comprising: a first supporting plate adapted for mounting on the deck of the boat; a vertical post; means for swively mounting the lower end of said post on said first supporting plate; a second supporting plate adapted for attachment to the underside of the boat seat; means for rotatably and slidably connecting the upper end of said post to said second supporting plate; a first arm fixedly mounted on the upper end of said post and extending outwardly therefrom; a control cable connected to the tiller arm; means for connecting the tiller arm control cable to said first arm; a second arm fixedly mounted on the lower end of said post and extending outwardly therefrom; said arms being in vertical alignment; and, a cross-bar carried by said second arm for engagement by the feet of a person sitting in the boat for swivelling said post, whereby, said tiller arm control cable will be moved as desired.

3. The combination of a boat with a deck, a seat, a tiller arm, and a steering device for the boat comprising: a first supporting plate adapted to be mounted on the deck of the boat; a ball joint housing on said first plate; a first support rod; a ball member on the lower end of said first support rod and being swivelly mounted in said ball joint housing; a hollow post having the lower end thereof fixedly mounted on the upper end of said rod; a second support rod slidably and rotatably mounted in the upper end of said hollow post; a second supporting plate connected to said second support rod and being adapted to be mounted on the underside of the boat seat; a first arm fixedly mounted on said post toward the upper end thereof and extending outwardly therefrom; a control cable connected to the tiller arm; means for connecting the tiller arm control cable to said first arm; a second arm fixedly mounted on said post toward the lower end thereof, and being spaced apart from said first arm and in vertical alignment therewith; and, means carried by said second arm for engagement by the feet of a person sitting in the boat for swivelling said post on said rods, whereby, said tiller arm control cable may be actuated to move the tiller arm and steer the boat.

4. The combination of a boat with a deck, a seat, a tiller arm, and a steering device for the boat comprising: a first supporting plate adapted to be mounted on the deck of the boat; a ball joint housing on said first plate; a first support rod; a ball member on the lower end of said first support rod and being swivelly mounted in said ball joint housing; a hollow post having the lower end thereof fixedly mounted on the upper end of said rod; a second support rod slidably and rotatably mounted in the upper end of said hollow post; a second supporting plate connected to said second support rod and being adapted to be mounted on the underside of the boat seat; a first arm fixedly mounted on said post toward the upper end thereof and extending outwardly therefrom; a bushing fixedly mounted on the outer end of said first arm and depending therefrom; a control cable connected to the tiller arm; said bushing being provided with a transverse aperture therethrough adapted to receive the tiller arm control cable; means for releasably locking said cable in said bushing aperture; a second arm fixedly mounted on said post toward the lower end thereof, and being spaced apart from said first arm and in vertical alignment therewith; and, a cross-bar fixedly mounted on the outer end of said second arm and being adapted to be engaged by the feet of a person sitting in the boat for swivelling said post on said rods, whereby, said tiller arm control cable may be actuated to move the tiller arm and steer the boat.

References Cited in the file of this patent

UNITED STATES PATENTS

| | | |
|---|---|---|
| 312,071 | Batz | Feb. 10, 1885 |
| 636,479 | Willis | Nov. 7, 1899 |
| 2,633,096 | Rayfield | Mar. 31, 1953 |
| 2,668,513 | Reynolds | Feb. 9, 1954 |

FOREIGN PATENTS

| | | |
|---|---|---|
| 25,571 | Great Britain | Nov. 4, 1897 |
| 386,484 | France | Jan. 23, 1908 |